United States Patent [19]
Porterfield

[11] Patent Number: 5,920,881
[45] Date of Patent: Jul. 6, 1999

[54] METHOD AND SYSTEM FOR USING A VIRTUAL REGISTER FILE IN SYSTEM MEMORY

[75] Inventor: A. Kent Porterfield, New Brighton, Minn.

[73] Assignee: Micron Electronics, Inc., Nampa, Id.

[21] Appl. No.: 08/859,015

[22] Filed: May 20, 1997

[51] Int. Cl.$^6$ ............................................. G06F 12/08
[52] U.S. Cl. ............................. 711/2; 711/5; 711/209
[58] Field of Search ................................ 711/2, 5, 209; 365/230.03, 230.06

[56] References Cited

U.S. PATENT DOCUMENTS

| | | | |
|---|---|---|---|
| 4,067,058 | 1/1978 | Brandstaetter et al. | 395/740 |
| 4,382,278 | 5/1983 | Appelt | 711/122 |
| 4,481,573 | 11/1984 | Fukunaga et al. | 711/207 |
| 4,747,044 | 5/1988 | Schmidt et al. | 711/202 |
| 4,757,438 | 7/1988 | Thatte et al. | 711/6 |
| 4,787,026 | 11/1988 | Barnes et al. | 364/228 |
| 5,095,427 | 3/1992 | Tanaka et al. | 395/406 |
| 5,321,836 | 6/1994 | Crawford et al. | 711/206 |
| 5,481,688 | 1/1996 | Takagi | 711/208 |

*Primary Examiner*—Jack A. Lane
*Attorney, Agent, or Firm*—Seed and Berry LLP

[57] ABSTRACT

A computer bridge processes transactions in a computer system that includes a system memory. The bridge includes a first address decoder that allocates address space to the system memory according to a first allocation scheme and, in response to receiving transaction requests, directs the transaction requests to the system memory according to the first allocation scheme. The bridge also includes a second address decoder that allocates address space to the system memory and to a selected target device according to a second allocation scheme. In response to receiving transaction requests, the second address decoder directs the transactions requests to the system memory and the selected target device according to the second allocation scheme.

21 Claims, 4 Drawing Sheets

METHOD AND SYSTEM FOR USING A VIRTUAL REGISTER FILE IN SYSTEM MEMORY

TECHNICAL FIELD

The present invention relates to processing transactions in a computer system, and more particularly, to allocating address space to a system memory and to other computer devices.

BACKGROUND OF THE INVENTION

In recent years the memory requirements for personal computers have greatly increased. A major cause of the need for more memory is the desire of computer users to display graphical images, including three-dimensional graphic images, with high accuracy and detail. As a result, many personal computers being sold today include more than 16 megabytes (MB) of available system memory.

A problem with having more than 16 MB of memory is that some computer devices, such as an industry standard architecture (ISA) computer bus, cannot recognize addresses greater than the 24 bits needed to address 16 MB ($2^{24}$=16 MB). As a result, prior art systems with more than 16 MB of system memory have allocated to ISA devices addresses below 16 M to allow software visibility to the ISA devices on the ISA bus. Allocating addresses below 16 M to the ISA devices means that some system memory must be deallocated. That is, the software used by the computer system processor is not given addresses that allow the software to access the deallocated memory portion. The prior art computer systems waste valuable memory resources by simply ignoring the deallocated memory portion.

An example of the problem of deallocating memory can be appreciated with respect to FIG. 1. On the left side of FIG. 1 is a physical view of the computer system memory which has 24 MB of memory locations. On the right side of FIG. 1 is a view of the computer system's address space that is visible to the computer system software. The computer system has a Peripheral Component Interconnect (PCI) that is allocated system addresses greater than 24 M. The computer system also has an ISA bus that is unable to process system addresses above 16 M because the ISA bus has only a 24 bit address bus. Thus, the ISA devices must be allocated system addresses of 16 M or less. That is, the computer system allocates system addresses from 15 M to 16 M to the ISA devices so that the ISA devices can be accessed. In allocating 1 MB of system addresses to the ISA devices, the prior art computer system can allocate fewer system addresses to the system memory. As a result, a 1 MB portion of the physical storage locations of the system memory will go unused.

SUMMARY OF THE INVENTION

An embodiment of the present invention is directed to a method for executing transaction requests from a plurality of requesting devices in a computer system having a plurality of target devices including a system memory. A block of the system memory and one of the target devices are assigned the same set of addresses. In response to receiving a transaction request that includes an address in the set, the method directs the transaction request to the block of the system memory if the transaction request is from a first one of the requesting devices. If the transaction request is from a second one of the requesting devices, then the method directs the transaction request to the target device.

An embodiment of the invention also is directed to a computer bridge for processing transactions in a computer system that includes a system memory. The bridge includes a first address decoder that allocates address space to the system memory according to a first allocation scheme and, in response to receiving transaction requests, directs the transaction requests to the system memory according to the first allocation scheme. The bridge also includes a second address decoder that allocates address space to the system memory and to a selected target device according to a second allocation scheme. In response to receiving transaction requests, the second address decoder directs the transactions requests to the system memory and the selected target device according to the second allocation scheme.

DETAILED DESCRIPTION OF THE INVENTION

Figure 2:
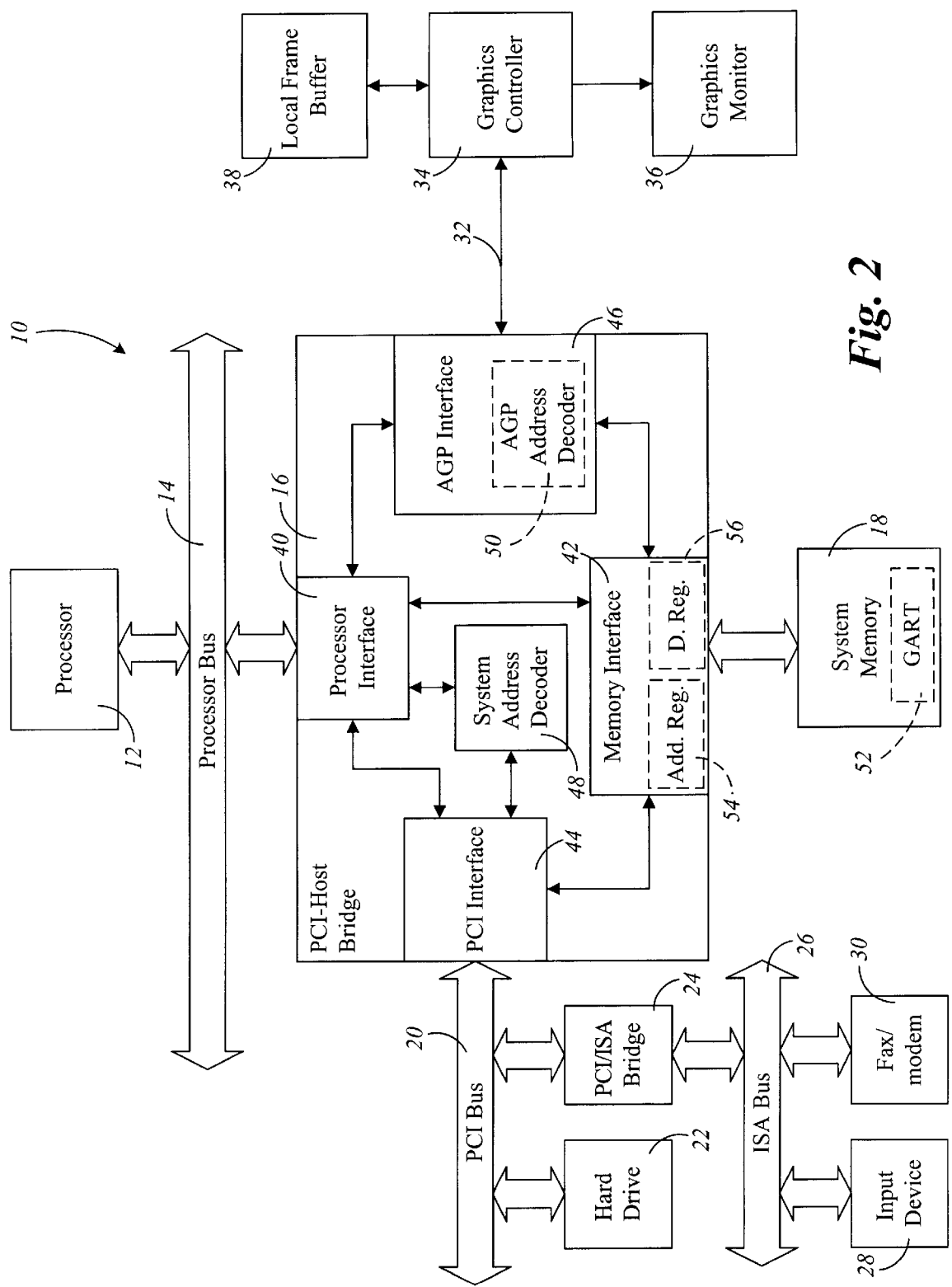
FIG. 2 is a block diagram of a computer system according to the present invention.

A computer system 10 for executing transaction requests according to an embodiment of the present invention is shown in FIG. 2. The computer system 10 includes a processor 12 coupled by a processor bus 14 to a PCI-host bridge 16. The processor 12 can include any microprocessor, such as the Pentium Pro™ microprocessor from Intel Corp. The computer system 10 also includes a system memory 18 generally comprised of dynamic random access memory (DRAM), which stores software instructions and data that is used by the processor 12 to perform a specified function. The software instructions include application programs and an operating system, such as Microsoft Windows NT™, that interfaces the application programs with the hardware of the computer system 10.

The PCI-host bridge 16 is coupled by an expansion bus 20, such as a Peripheral Component Interconnect (PCI) bus, to a plurality of PCI computer devices, such as a hard drive 22 and a PCI/ISA bridge 24. The PCI/ISA bridge 24 couples the PCI bus 20 to an Industry Standard Architecture (ISA) bus 26. Coupled to the ISA bus 26 are a plurality of ISA computer devices, such as an input device 28 and a fax/modem 30. The input device 28 can include any of numerous known input devices, such as a keyboard, mouse, and electronic pen and tablet. It will be appreciated that expansion buses other than PCI buses and ISA buses and other computer devices coupled to the expansion buses may be used.

The PCI-host bridge 16 is coupled by an Accelerated Graphics Port (AGP) 32 to a graphics controller 34. The AGP 32 is a high performance interconnect that enables the graphics controller 34 to access graphics information from the system memory 18 at a very high rate. The graphics controller 34 controls how graphics images are displayed on a graphics monitor 36 coupled to the graphics controller. Also coupled to the graphics controller 34 is a local frame buffer 38 that stores graphics information that is used to display the graphics images on the graphics monitor 36. Typically, the graphics information stored in the system memory 18 includes texture maps which are models of surface textures that are shared by different images displayed on the graphics monitor 36. The local frame buffer 38 typically stores other graphics information, such as Z buffers which are used to create 3-dimensional graphics images. It should be appreciated that any graphics information could be stored in either the system memory 18 or the local frame buffer 38 depending on the particular implementation provided by the processor 12 or the graphics controller 34.

The PCI-host bridge 16 provides an interface between the processor 12, system memory 18, PCI bus 20, and graphics controller 34. The PCI-host bridge 16 includes a processor interface 40 that controls how data is received from or sent to the processor 12 via the processor bus 14. The PCI-host bridge 16 also includes a memory interface 42 that controls how data is written to and read from the system memory 18. It will be appreciated that other memory configurations are possible, such as including a direct data bus connection between the processor bus 14 and the system memory 18 to allow data to be transmitted directly between the processor bus 14 and the system memory 18 without passing through the PCI-host bridge 16.

The PCI-host bridge 16 also includes a PCI interface 44 and an AGP interface 46, each coupled to the processor interface 40 and the memory interface 42. The PCI interface 44 controls data being transferred to or from the hard drive 22, input device 28, and fax/modem 30 via the PCI bus 20. The AGP interface 46 controls how data is transmitted across the AGP 32 between the graphics controller 34 and the PCI-host bridge 16. The AGP interface 46 primarily services to couple read requests received from the graphics controller 34 via the AGP 32 to the system memory 18 via the memory interface 42 to allow the graphics controller 34 to read graphics data stored in the system memory 18.

Figure 1:
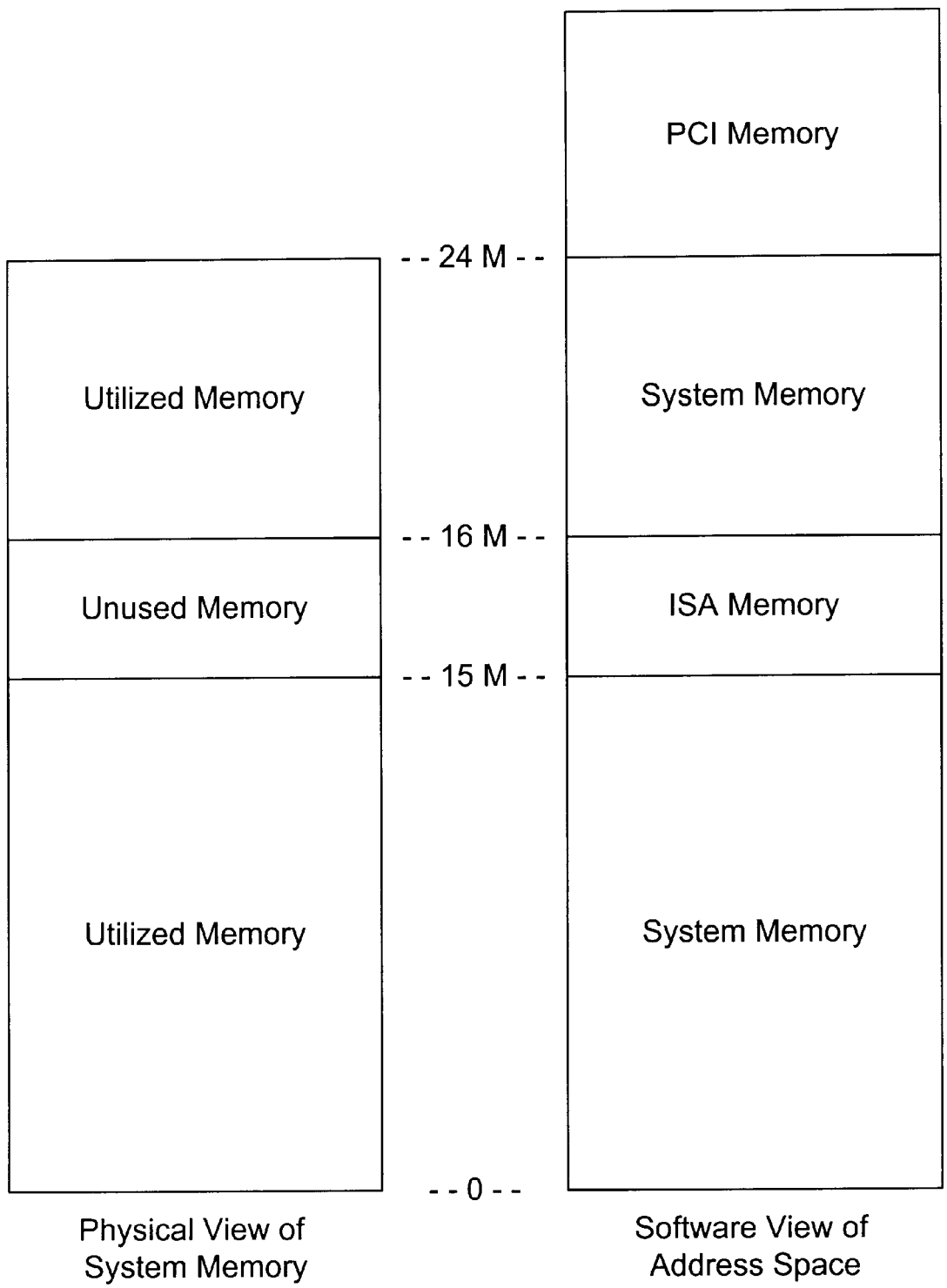
FIG. 1 is a block diagram of system memory and address space of a prior art computer system.

The PCI-host bridge 16 also includes a system address decoder 48 coupled to the processor interface 40, memory interface 42, and PCI interface 44. The system address decoder 48 stores a system address allocation table that specifies which system addresses are being allocated to the various components of the computer system 10. For example, the system address allocation table may specify that a first portion of the system memory 18 is allocated addresses 0 through 15 M, the ISA bus 26 is allocated addresses between 15 M and 16 M, a second portion of the system memory 18 is allocated addresses between 16 M and 24 M, and the PCI bus 20 is allocated addresses above 24 M, as shown in the right side of FIG. 1. The addresses allocated for each computer device in the system address allocation table typically will be set by the Basic Input-Output System (BIOS) software when the computer system 10 is initialized upon being turned ON.

When the processor 12 transmits on the processor bus 14 a transaction request for access to one of the component devices of the computer system 10, the processor interface 40 queries the system address decoder 48 regarding whether to forward the transaction request to the memory interface 42, PCI interface 44, or AGP interface 46. For example, if the processor 12 issues a transaction request to read from system address 15.5M, the processor interface 40 determines from the system address decoder 48 that system address 15.5 M belongs to the ISA bus 26. As a result, the processor interface 40 passes the transaction request to the PCI interface 44 which forwards the transaction request to the ISA bus 26 via the PCI bus 20 and the PCI/ISA bridge 24.

The AGP interface 46 also includes an AGP decoder 50 that functions similar to the system address decoder 50. That is, the AGP address decoder 50 includes a system address allocation table that specifies which system addresses are being allocated to the various components of the computer system 10. When the AGP interface 46 receives from the graphics controller 34 a transaction request for access to one of the component devices (usually the system memory) of the computer system, the AGP address decoder 50 determines whether to forward the transaction request to the processor interface 40, memory interface 42, or the PCI interface 44.

In one embodiment of the invention, both address decoders 48, 50 allocate the same system addresses for the computer devices such that a transaction request will be directed to the same computer device regardless of whether the transaction request originated from the processor 12 or the graphics controller 34. For example, both address decoders 48, 50 may specify that a first portion of the system memory 18 is allocated addressese 0 through 15 M, the ISA bus 26 is allocated addresses between 15 M and 16 M, a second portion of the system memory 18 is allocated addresses between 16 M and 24 M, and the PCI bus 20 is allocated addresses above 24 M. As discussed above, the ISA bus 26 cannot accept addresses above 16 M, so the ISA bus 26 is allocated addresses between 15 M and 16 M that would normally be allocated to the system memory 18. Thus, the portion of the system memory that would be allocated addresses between 15 M and 16 M if not for the ISA bus 26 is known as a deallocated portion of the system memory.

Figure 3:
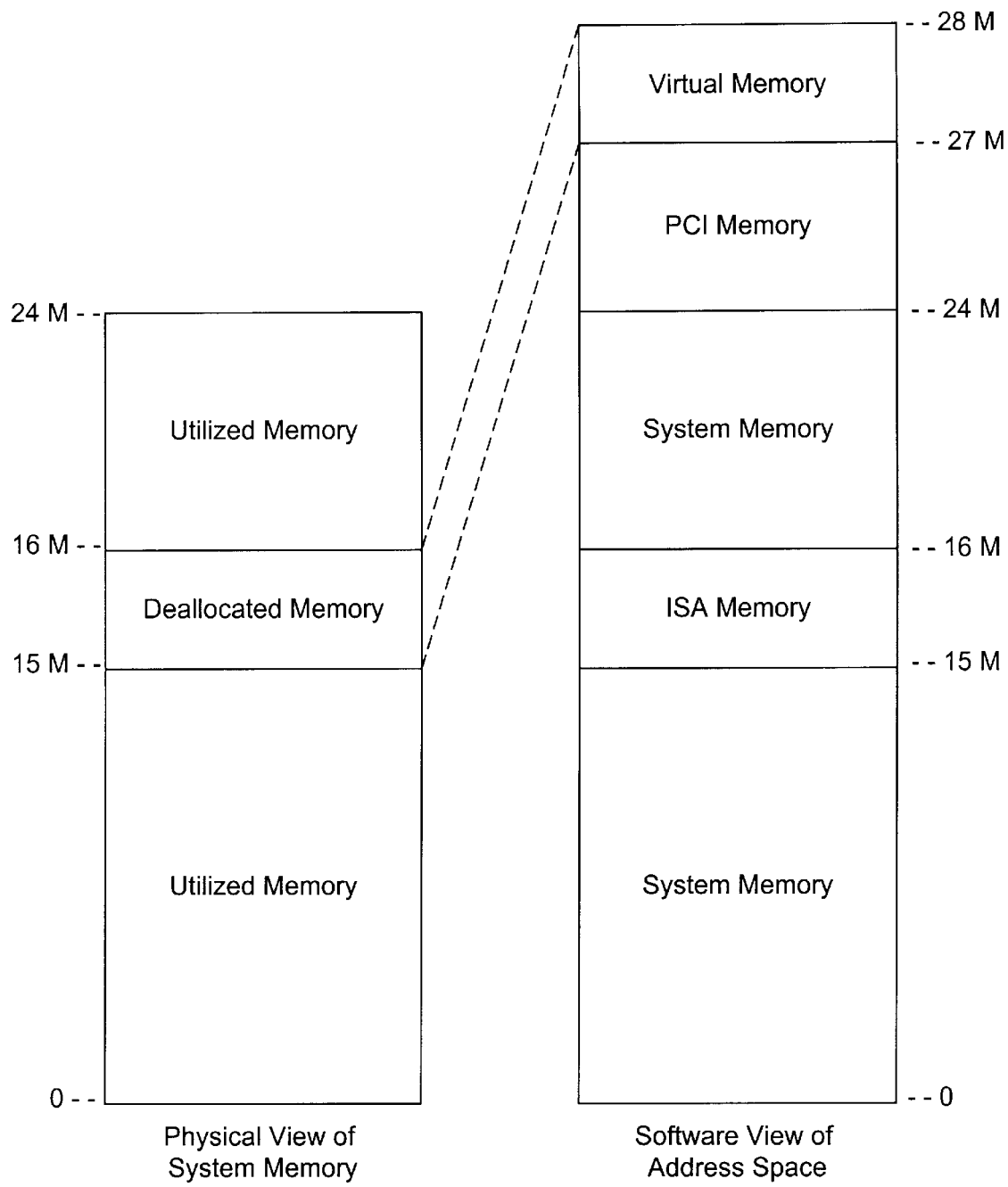
FIG. 3 is a block diagram of system memory and address space of the computer system shown in FIG. 2.

In contrast to prior art computer systems that simply waste the deallocated portion of the system memory 18, the computer system 10 employs an indirect addressing technique that enables the deallocated portion to be utilized. The indirect addressing technique involves allocating virtual system addresses to the deallocated portion of the system memory as shown in FIG. 3. For example, the address decoders 48, 50 may allocate to the deallocated portion virtual system addresses between 28 M and 29 M which are converted to physical addresses between 15 M and 16 M when accessing the deallocated portion. For example, in response to receiving a transaction request directed to system address 28 M+20 from the processor 12, the system address decoder 48 will convert the virtual system address of 28 M+20 to physical address 15 M+20 and direct the transaction request to the memory interface 42. The memory interface 42 uses the converted physical address 15 M+20 to access the location in the deallocated portion corresponding to physical address 15 M+20.

It will be appreciated that by employing two allocation schemes, the address decoders 48, 50 can access two separate computer devices with the same address. In the first allocation scheme, the address decoders 48, 50 employ direct addressing to allocate system addresses between 15 M and 16 M to the ISA bus 26. In the second allocation scheme, the address decoders 48, 50 employ indirect addressing to allocate the same physical addresses between 15 M and 16 M to the memory portion of the system memory 18 that was deallocated in the first allocation scheme. When the address decoders 48, 50 receive a transaction request for an address between 15 M and 16 M, the address decoders 48, 50 will direct the transaction request to the ISA bus 26. When the address decoders 48, 50 receive a transaction request directed to an address between 28 M and 29 M, then the address decoders 48, 50 convert the address to a physical address between 15 M and 16 M and cause the memory interface 42 to access the system memory 18 using the converted physical address between 15 M and 16 M.

It also will be appreciated that there are many devices other than the ISA bus 26 that cannot be addressed above 16 M that could benefit from having two address decoders to enable the devices to be accessed without wasting system memory. Further, many devices other than the graphics controller 34 could be employed to access the deallocated portion of system memory.

One item of graphics information that could be stored in the deallocated portion of the system memory 18 is a table 52 known as a Graphics Address Remapping Table (GART) (FIG. 2). As discussed above, much of the graphics data used to display graphics images on the graphics monitor 36 is stored in the system memory 18. As is typical, the memory interface 42 dynamically allocates the system memory 18 randomly-located kilobyte (KB) pages. However, to keep logical independence from the dynamic allocation of the system memory 18, the graphics controller 34 addresses the graphics data stored in the system memory 18 as a continuous block of address space. As a result, it is necessary to provide an address mapping mechanism that maps random 4 KB pages into a single contiguous address space. The GART implements this address mapping mechanism and is maintained by the memory interface 42. For example, when the memory interface 42 loads graphics data into a page beginning at 10 M, the memory interface 42 also stores in a register of the GART a data value that points to memory location 10 M.

The AGP specification distributed by Intel Corp. proposes the use of a GART to provide remapping, but the AGP specification does not specify where the GART should be implemented. One possibility would be to arrange the GART as a large register file within the memory interface 42. However, the memory interface 42 typically is implemented using an application-specific integrated circuit (ASIC), so locating the GART on the memory interface 42 would require many transistors, and thus, likely would be prohibitively expensive to manufacture. Instead of using registers on the memory interface 42, one embodiment of the present invention stores the GART in the deallocated portion of the system memory 18.

The GART can be implemented within the deallocated portion of the system memory 18 as a virtual register file that is accessed by the memory interface 42 as needed. In order to initialize and maintain individual registers within the GART, the memory interface 42 includes an index register 54 and a data register 56. For each successive register within the GART, the memory interface loads into the index register 54 an index value that points to the location of the register within the GART and loads into the data register 56 a data value to be stored in the GART register. The data value stored in the GART register points to a 4 KB page in the system memory 18 that stores graphics data. For example, assuming that the GART begins at physical address 15 M, the memory interface 42 may load a value of 8 into the index register 54 and a data value of 20 into the data register 56. The memory interface 42 then will store the data value of 20 into the GART register memory location 15 M+8. The memory interface also will load graphics data into a 4 KB page beginning at memory location 20. When the memory interface 42 dynamically allocates new pages in the system memory 18 for the graphics data to be used by the graphics controller 34, the memory interface 42 updates the appropriate GART registers to point to corresponding pages of the graphics data.

One should distinguish between the functions of the system address decoder 48, AGP address decoder 50, and the GART 52. The address decoders 48, 50 allocate system addresses to the system memory 18, PCI bus 20, and ISA bus 26 according to a first allocation scheme in which the ISA bus is allocated system addresses and a corresponding portion (i.e., the deallocated portion of the system memory 18) is allocated virtual system addresses. The address decoders 48, 50 also allocate physical addresses according to a second allocation scheme in which the deallocated portion of the system memory 18 is allocated physical addresses converted from the virtual system addresses and the ISA bus is not allocated addresses. The GART 52 is a table stored in the deallocated portion of the system memory 18 and includes registers storing target indexes pointing to graphics data stored in other portions of the system memory 18.

Figure 4:
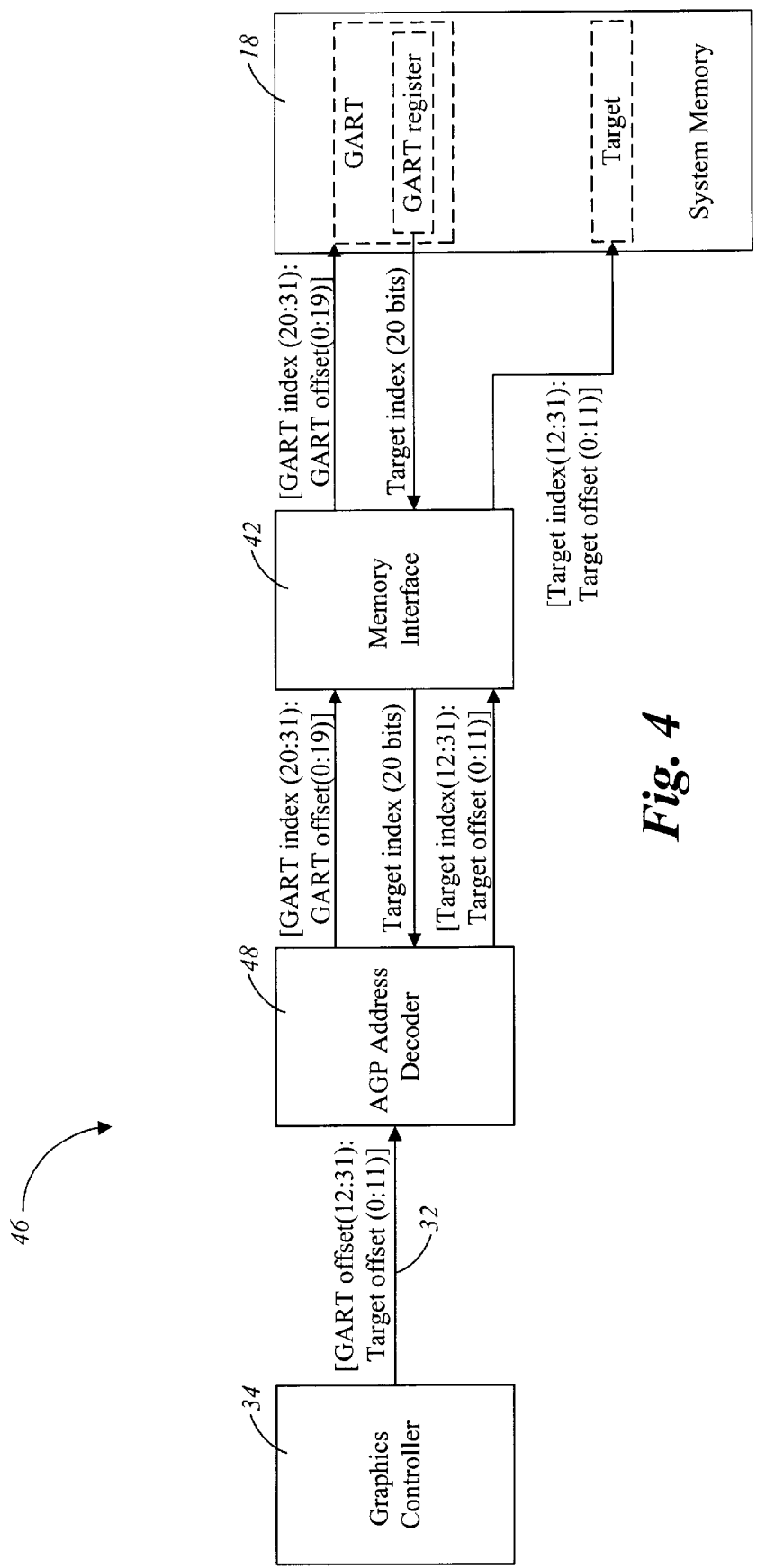
FIG. 4 is a block diagram of a portion of the computer system shown in FIG. 2.

A functional block diagram showing how the graphics controller 34 accesses target graphics data in the system memory 18 is shown in FIG. 4. To access graphics data stored in a target location in the system memory 18, the graphics controller 34 transmits a transaction request across the AGP 32 to the AGP interface 46. The transaction request includes an address, such as a 32-bit address, in the embodiment shown in FIG. 4. The address will be one of the virtual system addresses allocated to the deallocated portion of the system memory 18, such as a virtual address between 28 M and 29 M in the embodiment represented in FIG. 3. The lower 12 bits of the address are stored by the AGP interface 46 for use later as a target offset. The upper 20 bits (bits 12–31) of the address are recognized as a GART offset that specifies the location of a GART register relative to the beginning of the GART. The AGP address decoder 50 stores a 12-bit GART index that specifies the location of the beginning of the GART 52. The AGP address decoder 50 combines the 20-bit GART offset with the 12-bit GART index to obtain an absolute GART address pointing to one of the GART registers. For example, if the GART index is the upper 12 bits of 15 M and the GART offset is 100, then the GART register is at memory location 15 M+100.

The AGP address decoder 48 forwards the 32-bit combined GART index and GART offset to the memory interface 42 which reads the contents of the GART register pointed to by the absolute GART address. The GART register stores a 20-bit target index that is returned by the memory interface 42 to the AGP address decoder 48. The AGP address decoder 48 combines the 20-bit target index retrieved from the GART register with the 12-bit target offset transmitted by the graphics controller 34 with the transaction request. The memory interface 42 uses the combined target index and target offset to access the graphics data in the target location in the system memory 18 that is requested by the transaction request transmitted by the graphics controller 34. The target location can be written to or read from depending on the type of transaction request received from the graphics controller 34.

It will be appreciated that other computer devices of the computer system 10, such as the processor 12, can access the GART 52 in the deallocated portion of the system memory 18. The method used to access the GART 52 and corresponding graphics data will be identical to that discussed above except that the system address decoder 48 is used instead of the AGP address decoder 50.

Based on the foregoing discussion, it will be appreciated that the present invention enables a deallocated portion of computer memory to be efficiently utilized rather than wasted. Although the foregoing discussion emphasizes allowing a graphics controller access to the deallocated memory portion, the invention is not so limited and the concepts discussed herein can be employed using various other computer devices. The embodiments described herein provide a low-cost alternative to implementing a large register file on a memory interface implemented by an ASIC.

It should be understood that even though numerous advantages of the present invention have been set forth in the foregoing description, the above disclosure is illustrative only. Changes may be made in detail and yet remain within the broad principles of the present invention.

I claim:

1. A method for executing transaction requests from a plurality of requesting devices in a computer system having a plurality of target devices including a system memory, the method comprising:

allocating a selected physical address to a selected one of the target devices;

allocating a virtual address to a first selected memory block of the system memory;

receiving a transaction request directed to a requested address;

directing the transaction request to the selected target device if the requested address is the selected physical address allocated to the target device; and if the requested address is the virtual address allocated to a first memory location, then converting the requested address to the selected physical address and using the selected physical address to access the selected memory block of the system memory.

2. The method of claim 1, further comprising:

storing in the selected block of the system memory a register file having a plurality of registers, each register storing addressing information that references a memory location in the system memory.

3. The method of claim 2, further comprising:

storing in an index register an index that points to a selected one of the registers of the register file;

storing in a data register the addressing information that references a selected memory location in the system memory, and writing to the selected register, pointed to by the index stored in the index register, the addressing information stored in the data register.

4. The method of claim 1 wherein when the target address of the transaction request is the virtual address allocated to the selected memory block in the system memory, the method further comprising:

using a first portion of the requested address to index a table entry stored in the selected block of the system memory, the table entry storing an index for a location in the system memory targeted by the transaction request; and using a second portion of the requested address, together with the index stored in the table entry, to access the targeted location in the system memory.

5. The method of claim 1 wherein the target device cannot be addressed by an address greater than X bits and the system memory includes sufficient memory locations that require at least X bits to be uniquely addressed, wherein the step of allocating the selected physical address to the target devices includes allocating the selected physical address using X bits or fewer and the step of allocating the virtual address to the selected block includes allocating the virtual address using more than X bits.

6. The method of claim 1 wherein the receiving step includes receiving at a graphics interface the transaction request from a graphics controller, the method further comprising:

storing in the selected block of the system memory a graphic address remapping table having a table entry that points to a target location within the system memory, the table entry being accessed by the selected physical address after the virtual address is converted to the selected physical address.

7. A method for executing transaction requests in a computer system having a plurality of target devices including a system memory, the method comprising:

allocating a selected block of the system memory an address according to a first allocation scheme;

allocating a selected one of the target devices a physical address according to a second allocation scheme in which a portion of the system memory is allocated a physical address and the selected block is not allocated a physical address;

executing a first transaction request using the selected block of system memory, the first transaction request including the address allocated to the selected block according to the first allocation scheme; and executing a second transaction request using the selected target device, the second transaction request including the physical address allocated to the selected target device according to the second allocation scheme.

8. The method of claim 7 wherein the step of executing the first transaction request includes receiving the first transaction request at a first address decoder that directs the transaction request to the selected block of the system memory and the step of executing the second transaction request includes receiving the second transaction request at a second address decoder that directs the transaction request to the selected target device.

9. The method of claim 7 wherein the address allocated to the selected block of the system memory according to the first allocation scheme is identical to the physical address allocated to the selected target device according to the second allocation scheme.

10. The method of claim 7, further comprising:

storing in the selected block of the system memory a register file having a plurality of registers, each register storing addressing information that references a storage location in the system memory.

11. The method of claim 7 wherein the first transaction request includes a requested address and the step of executing the first transaction request includes:

using a first portion of the requested address to index a table entry stored in the selected block of the system memory, the table entry storing an index for a location in the system memory targeted by the transaction request; and using a second portion of the requested address, together with the index stored in the table entry, to access the targeted location in the system memory.

12. The method of claim 7 wherein the receiving step includes receiving at a graphics interface the transaction request from a graphics controller, the method further comprising:

storing in the selected block of the system memory a graphic address remapping table that remaps a virtual address into a physical address of a target memory location within the system memory; and transmitting from a graphics controller to a graphics interface the first transaction request which includes the virtual address.

13. A computer system that executes transaction requests, comprising:

first and second target devices that respond to transaction requests for a selected address; and a bridge coupled to each of the target devices, the bridge being structured to allocate the same physical address to each of the target devices, to direct a first transaction request to the first target device if the transaction request includes a requested address identical to the physical address allocated to each of the target devices, and to direct the transaction request to the second target device if the requested address is a virtual address that is converted to the physical address to access the second target device.

14. The computer system of claim 13 wherein the first target device cannot be addressed by an address with greater than X bits and the second target device is a system memory with more addressable memory locations than can be uniquely addressed with X bits.

15. The computer system of claim 13 wherein the first target device is a system memory that stores a register file having a plurality of registers each storing addressing information that references a memory location in the system memory.

16. The computer system of claim 15 wherein the bridge includes:

an index register storing an index that points to a selected one of the registers in the register file;

a data register storing the addressing information that references a selected memory location in the system memory; and a memory interface that writes to the selected register pointed to by the index in the index register the addressing information stored in the data register.

17. The computer system of claim 13 wherein the first target device is a system memory storing graphics data, the computer further comprising:

a graphics controller coupled to the bridge by an accelerated graphics port, the graphics controller transmitting to the bridge the transaction request with the requested address being the virtual address.

18. The computer system of claim 13 wherein the first target device is a computer bus and the second target device is a system memory.

19. A computer bridge for processing transactions in a computer system that includes a system memory, the bridge comprising:

a memory interface that controls access to the system memory;

a target device interface that controls access to a target device; and an address decoder structured to allocate a virtual address block to a selected block of the system memory, to allocate a selected physical address to a selected target device and, in response to receiving a transaction that includes a virtual address of the virtual address block allocated to the selected block, to convert the virtual address to the selected physical address, and direct the transaction request to the selected block of the system memory using the selected physical address.

20. The computer bridge of claim 19, further comprising:

a graphics interface that receives the transaction request from a graphics controller, the graphics interface using the address decoder to direct the transaction request from the graphics controller to the selected block of the system memory.

21. The computer bridge of claim 20, further comprising:

a processor interface that receives a transaction request from a computer processor, the processor interface using the address decoder to direct the transaction request from the computer processor to either the selected block system memory or the selected target device depending on whether the transaction request includes the virtual address or the selected physical address.

* * * * *